United States Patent
Bargetto et al.

(10) Patent No.: US 10,138,104 B2
(45) Date of Patent: Nov. 27, 2018

(54) BELOW THE BEAD FOIL CUTTER

(71) Applicants: John Bargetto, Scotts Valley, CA (US); Robert E. Blumberg, Santa Cruz, CA (US)

(72) Inventors: John Bargetto, Scotts Valley, CA (US); Robert E. Blumberg, Santa Cruz, CA (US)

(*) Notice: Subject to any disclaimer, the term of this patent is extended or adjusted under 35 U.S.C. 154(b) by 0 days.

(21) Appl. No.: 14/818,092

(22) Filed: Aug. 4, 2015

(65) Prior Publication Data

US 2017/0043990 A1    Feb. 16, 2017

Related U.S. Application Data

(60) Provisional application No. 62/086,909, filed on Dec. 3, 2014, provisional application No. 62/034,357, filed on Aug. 7, 2014.

(51) Int. Cl.
*B67B 7/00* (2006.01)
*B67B 7/46* (2006.01)
*B67B 7/04* (2006.01)

(52) U.S. Cl.
CPC ............ *B67B 7/34* (2013.01); *B67B 7/30* (2013.01); *B67B 2007/0458* (2013.01)

(58) Field of Classification Search
CPC .................................................. B67B 7/34
USPC ................ 30/1.5, 306, 307; D8/41
See application file for complete search history.

(56) References Cited

U.S. PATENT DOCUMENTS

| | | | | |
|---|---|---|---|---|
| 561,862 A | * | 6/1896 | Brown | B67B 7/34 30/1.5 |
| 896,303 A | * | 8/1908 | Klepper | B67B 7/30 30/1.5 |
| 996,433 A | * | 6/1911 | Stone | B67B 7/16 30/1.5 |
| 999,668 A | * | 8/1911 | Montaperto | B23D 21/08 169/35 |
| 1,102,124 A | * | 6/1914 | Baptiste | B67B 7/30 30/1.5 |
| 1,841,270 A | * | 1/1932 | Aeschbach et al. | B67B 7/18 30/1.5 |
| 1,977,441 A | * | 10/1934 | Kenerson | B23D 21/08 30/1.5 |
| 2,227,421 A | * | 1/1941 | Bjork | B67B 7/30 30/1.5 |

(Continued)

FOREIGN PATENT DOCUMENTS

| CA | 2320432 A1 | * | 3/2001 | ............. B67B 7/30 |
|---|---|---|---|---|
| CA | 2551651 A1 | * | 1/2007 | ............. B67B 7/30 |

(Continued)

*Primary Examiner* — Jason Daniel Prone
(74) *Attorney, Agent, or Firm* — Soquel Group LLC

(57) ABSTRACT

A device for cutting the foil on a bottle, including a circular shaped body that has a top end and a lower end, wherein the body includes a lip at the top end that protrudes inward such that it can rest on top of the mouth of a bottle, and a plurality of cutting elements attached to the lower end of the body on the inside, such that when the outside of the body is pressed by the hand of a user the cutting elements make contact with foil wrapped around the top end of a bottle, and where the distance from the top end of the body to the lower end is sufficient to enable the cutting elements to make contact with the foil below the bead of the bottle.

7 Claims, 3 Drawing Sheets

(56) References Cited

U.S. PATENT DOCUMENTS

| | | | | |
|---|---|---|---|---|
| 2,271,308 | A * | 1/1942 | Ross | B67B 7/30 30/1.5 |
| 2,305,642 | A * | 12/1942 | Sorenson | B67B 7/30 30/1.5 |
| D142,202 | S * | 8/1945 | Lanyon | 30/1.5 |
| 2,439,894 | A * | 4/1948 | Jahn et al. | B67B 7/34 30/1.5 |
| 2,497,388 | A * | 2/1950 | Zuba | B67B 7/30 30/1.5 |
| D159,139 | S * | 6/1950 | Cicero | D8/41 |
| 2,566,653 | A * | 9/1951 | Callahan et al. | B67B 7/30 30/1.5 |
| 2,578,404 | A * | 12/1951 | Dimitruk | B67B 7/30 30/1.5 |
| 2,588,096 | A * | 3/1952 | Eckenboy | B67B 7/02 30/1.5 |
| 2,589,742 | A * | 3/1952 | Smith | B67B 7/30 30/1.5 |
| 2,691,820 | A * | 10/1954 | Hislop | B67B 7/16 30/1.5 |
| 2,694,854 | A * | 11/1954 | Kannenberg | B67B 7/30 30/1.5 |
| 2,718,692 | A * | 9/1955 | Krzanowski | B67B 7/30 30/1.5 |
| 2,722,736 | A * | 11/1955 | Svalgaard | B67B 7/30 30/1.5 |
| 2,823,395 | A * | 2/1958 | Brownson | B67B 7/0411 30/1.5 |
| 3,025,597 | A * | 3/1962 | Huglin | B23D 21/08 30/102 |
| 3,203,087 | A * | 8/1965 | Jahn | B67B 7/34 30/1.5 |
| 4,567,655 | A * | 2/1986 | Jacobs | B67B 7/34 30/1.5 |
| D297,201 | S * | 8/1988 | Allen | D8/41 |
| 4,845,844 | A * | 7/1989 | Allen | B26B 27/00 30/1.5 |
| D308,811 | S * | 6/1990 | Hochfeld | D8/41 |
| 4,972,587 | A * | 11/1990 | Horntrich | B26B 27/00 30/1.5 |
| 5,235,748 | A * | 8/1993 | Jahn | B67B 7/34 30/1.5 |
| 5,351,579 | A * | 10/1994 | Metz | B67B 7/0405 30/1.5 |
| 5,372,054 | A * | 12/1994 | Federighi, Sr. | B67B 7/0405 30/1.5 |
| 5,653,023 | A * | 8/1997 | Andina | B67B 7/34 30/1.5 |
| 5,659,963 | A * | 8/1997 | McCrady | B26B 5/00 30/1.5 |
| 5,878,497 | A * | 3/1999 | Seemann, III | B67B 7/0441 30/1.5 |
| 5,893,301 | A * | 4/1999 | Hensley | B67B 7/30 7/156 |
| D422,861 | S * | 4/2000 | Hollinger | D8/41 |
| 6,151,779 | A * | 11/2000 | Brown | B26B 27/00 30/1.5 |
| 6,196,086 | B1 * | 3/2001 | Gort-Barten | B67B 7/0441 30/1.5 |
| D446,103 | S * | 8/2001 | Olaneta | D8/41 |
| D454,288 | S * | 3/2002 | Kilduff | B67B 7/0447 D8/41 |
| D458,820 | S * | 6/2002 | Kay | D8/41 |
| D459,963 | S * | 7/2002 | Usbeck | D8/41 |
| 6,477,775 | B2 * | 11/2002 | Scribner | B67B 7/36 30/1.5 |
| D501,774 | S * | 2/2005 | Bates | D8/41 |
| 6,886,253 | B2 * | 5/2005 | Chan | B67B 7/30 30/1.5 |
| D605,011 | S * | 12/2009 | Jalet | D8/41 |
| 8,601,697 | B2 * | 12/2013 | Whittaker | B26D 3/169 30/102 |
| 8,667,867 | B2 * | 3/2014 | Mills | B67B 7/0405 30/1.5 |
| 8,991,057 | B2 * | 3/2015 | Jaynes | B67B 7/30 30/1.5 |
| 2002/0092169 | A1 * | 7/2002 | Kilduff | B67B 7/30 30/1.5 |
| 2003/0188442 | A1 * | 10/2003 | Imer | B67B 7/30 30/1.5 |

FOREIGN PATENT DOCUMENTS

| | | | | |
|---|---|---|---|---|
| DE | 2948225 | A1 * | 6/1981 | B67B 7/30 |
| EP | 0419422 | A1 * | 3/1991 | B67B 7/30 |
| FR | 2436751 | A1 * | 4/1980 | B67B 7/34 |

* cited by examiner

BELOW THE BEAD FOIL CUTTER

TECHNICAL FIELD

The present invention relates to a device that cuts the foil off a wine bottle below the bead.

BACKGROUND

Historically, the foil that seals the top of a wine bottle was typically cut below the bead. This was because lead was a principal ingredient in the foil and it was considered desirable to not mingle or allow contact between the wine and the lead foil while pouring. This proved beneficial as lead was eventually discovered to be toxic.

In the past several decades lead has been replaced by other, non-toxic, materials such as tin, aluminum and plastic and it is not necessary to cut below the bead for health purposes. The result is that commercially available foil cutters typically cut above the lip of a wine bottle, presumably because such foil cutters are simpler in design and cheaper to manufacture.

However, it is still considered elegant and historically correct to cut the foil of a wine bottle below the bead. For example, sommeliers, trained wine stewards that typically work in wine bars or expensive restaurants that offer extensive selections of wine, continue to cut the foil of a wine bottle below the bead. Typically, sommeliers use a special knife that is integrated into a wine bottle opener to accomplish this. However, cutting below the bead cannot be accomplished with prior art foil cutters.

Therefore, it would be advantageous to provide a device for cutting the foil of a wine bottle below the bead.

SUMMARY OF THE DESCRIPTION

Various embodiments are directed towards a device for cutting the foil of a wine bottle, referred to herein as a "foil cutter" below the bead.

Two similar embodiments are disclosed, each of use cutting wheels to cut the foil. The first embodiment includes three cutting elements, or cutting wheels, referred to generically herein as "cutters", and a second embodiment that includes four cutting wheels or cutters.

A third embodiment discloses an approach that uses three bent cutting edges, or cutters.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein:

FIG. 3B shows the device in an upright state. FIG. 3D shows an embodiment of the device in which the cutters are angled.

DETAILED DESCRIPTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. The following detailed description is, therefore, not to be taken in a limiting sense.

Figure 1:
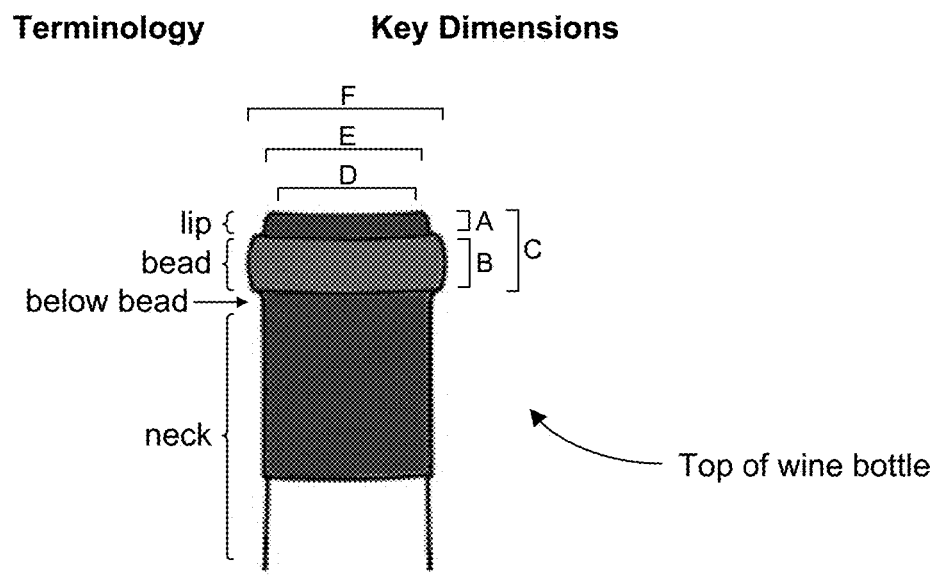
FIG. 1 provide the key terminology and dimensions for a wine bottle.

As used herein the following terms are used to refer to parts of a wine bottle, and bottles in general, and have the meanings, as illustrated in FIG. 1, given below:

Lip (of a bottle)—as illustrated in FIG. 1, the lip refers to a cylindrical surface at the top of the wine bottle that encircles the opening, or mouth, of the bottle, where a cork or other stopper is inserted. The lip ends at the bead or collar.

Bead (of a bottle)—as illustrated in FIG. 1, is a raised cylindrical surface just below the lip that protrudes outward. This is also referred to as the collar. The term "below the bead" refers to the surface just below the bead that tapers into the neck of the bottle.

Mouth (of a bottle)—as illustrated in FIG. 1, refers to the opening at the top of a bottle where a cork or other stopper may be inserted.

Generally, terms such as bottle, cork, neck, and body have their normal meanings as used with reference to wine bottles and more generally with respect to other types of bottles, e.g. bottles used for beer and other beverages, unless otherwise specified herein. The inventions described herein are intended to work primarily with wine bottles but the application of the inventions are not so limited and may be used with other types of bottles as well. Further, not all wine bottles have the same shape so the invention described herein will work with certain wine bottles and may not work with others.

Dimensions

FIG. 1 illustrates the key terminology and dimensions of a typical wine bottle. While the inner mouth of a wine bottle, referred to as D in FIG. 1, is fairly standard other dimensions are somewhat more variable. Generally, a goal of the present invention is to accommodate a large percentage of bottles in use without making operation of the device too difficult for the user. Example dimension sizes are given below. However, the device may be made so as to accommodate somewhat larger or smaller bottle sizes without departing from its scope and spirit.

Referring to FIG. 1, dimension A refers to the vertical length of the lip of the bottle. This distance is typically 6 mm.

Dimension B is the vertical distance of the bead. This distance is typically 14-16 mm.

Dimension C refers to the distance from the top of the bottle to the point just below the bead. This distance is typically in the range of 18-26 mm and most typically it is approximately 22 mm.

Dimension D refers to the inner mouth or opening of the bottle. Most standard wine bottles have a bore (inner mouth) diameter of 18.5 mm at the mouth of the bottle which increases to 21 mm before expanding into the full bottle.

Dimension E refers to the outer diameter of the top or mouth of the bottle. This distance is most typically in the range of 20-32 mm and most typically in the range of 24-28 mm. Although certain bottles, such as Burgundy wine bottles may have a diameter of approximately 33 mm.

Dimension F refers to the outer diameter of the widest point on the bead. This distance is typically 29-32 mm.

3 Cutter Embodiment

Figure 2A:
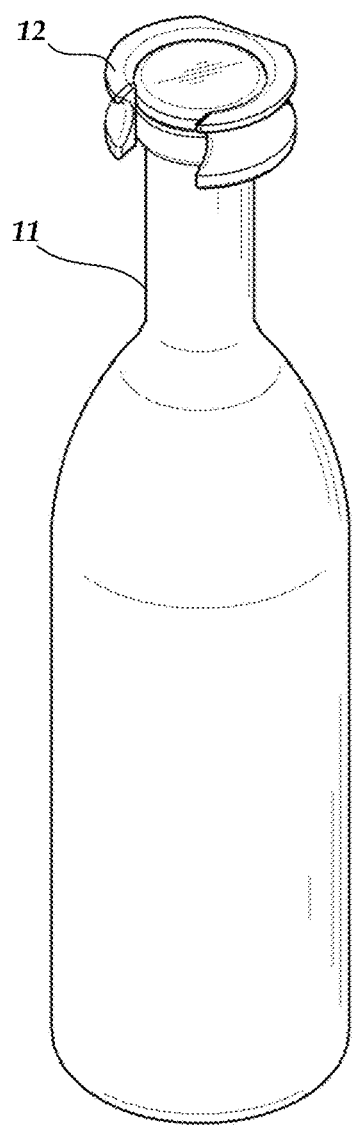
FIGS. 2A-C illustrate an embodiment of a foil cutter with three cutters that cuts foil below the bead of a wine bottle.
Figure 2C:
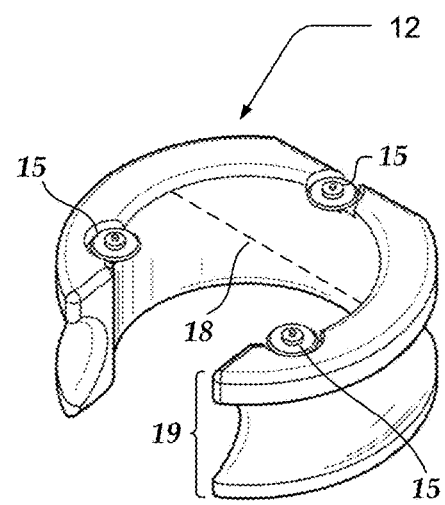
Figure 2B:
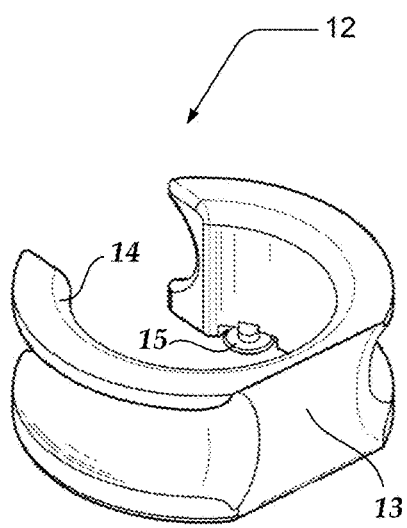

FIGS. 2A-C provide different views of a three wheel foil cutter that cuts the foil of a bottle below the bead. FIG. 2A depicts a bottle 11 with a foil cutter 12 mounted in the correct position on top of bottle 11.

FIG. 2B illustrates a top, isometric view of foil cutter 12. Foil cutter 12 includes a body 13 which has a top end with a retaining lip 14 that protrudes inward. Lip 14 enables foil cutter 12 to rest on the mouth of bottle 11 and secures or retains bottle 11 from the top. Foil cutter 12 also includes three cutters 15 that attach to body 13 at its bottom end. The top end of foil cutter 12 defines a top opening and the bottom end of foil cutter 12 defines a bottom opening. The top end of bottle 11 may be inserted inside of foil cutter 12. When inserted, the mouth of bottle 11 rests against lip 12 and cutting wheels 15 align with the point below the bead, as defined by Dimension C of FIG. 1.

Body 13 may be made of molded plastic, sheet metal or another semi-rigid material of an appropriate thickness that bends inward when a user presses against it from the exterior.

Retaining lip 14 protrudes towards the center of foil cutter 12 several millimeters enabling it to rest securely on the top or mouth of bottle 11.

In certain embodiments, as depicted in FIGS. 2B and 2C, cutters 15 are cutting wheels that press against bottle 11 and turn or rotate as a user rotates foil cutter 12 around the outside of bottle 11 thus cutting a foil wrapper that covers the top of bottle 11. In other embodiments, cutters 15 may be fixed wheels or fixed cutting elements, such as a blade made of metal, plastic or the like. In certain embodiments, cutters 15 are angled upwards so as to assist in taking the foil off the bottle.

The interior diameter 18 of foil cutter 12 is slightly larger than the diameter of the outside of bottle 11, i.e. dimension E of FIG. 1. The height 19 of foil cutter 12, i.e. the axial distance from cutters 15 to the top side of foil cutter 12, is approximately the distance from the top of the bottle to below the bead, i.e. dimension C of FIG. 1.

In operation, a human user inserts bottle 11 inside of foil cutter 12 until the top of bottle 11 presses against retaining lip 14. The user presses two sides of foil cutter 12 against the bottle in order to ensure that cutters 15 contact the foil on the outside of bottle 11. In certain embodiments, body 13 is semi-rigid and the two sides of foil cutter 12 will slightly bend inward toward each other so as to contact bottle 11. The user then rotates foil cutter 12 in the clockwise or counter-clockwise direction, keeping cutters 15 in contact with bottle 11. It is desirable that the user rotate foil cutter 12 at least 120 degrees to ensure that the foil is cut through along the entire circumference of bottle 11. In certain embodiments, the user then pulls upward on foil cutter 12 which has the effect of pulling the top portion of the foil, above the cut, off bottle 11.

4 Cutter Embodiment

Figure 3A:
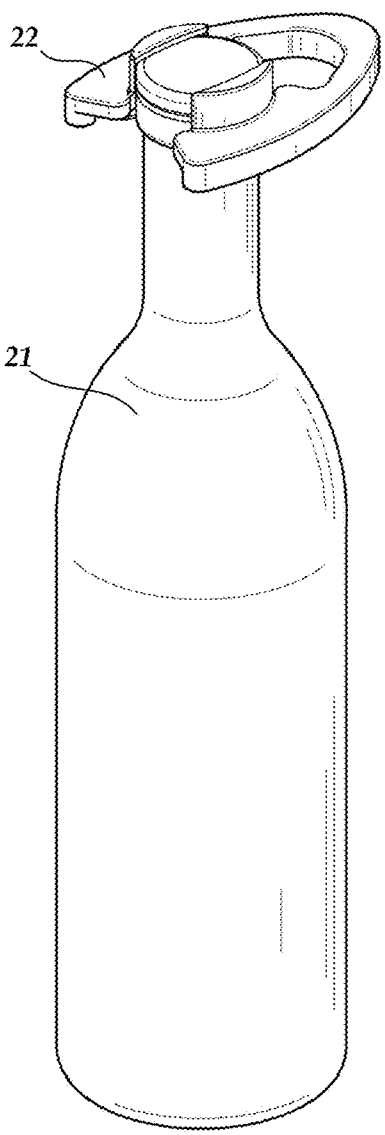
FIGS. 3A-D illustrate an embodiment of a foil cutter with four cutters that cuts foil below the bead of a wine bottle.
Figure 3B:
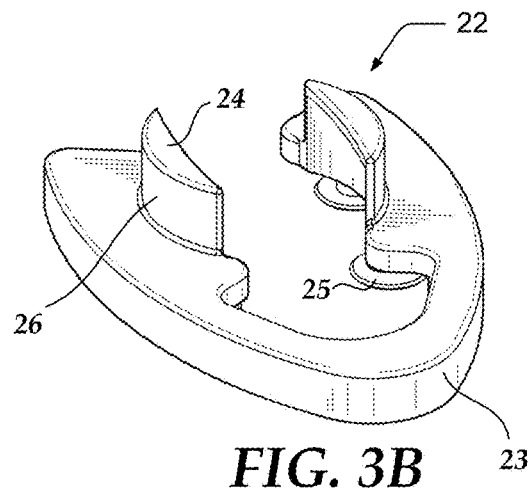
Figure 3C:
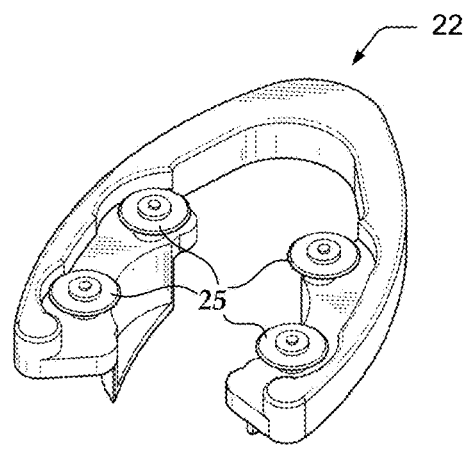

FIGS. 3A-C provide several views of a four wheel foil cutter 22 that cuts the foil of a bottle below the bead. Generally, the operation, function and design of foil cutter 22 is similar to that of foil cutter 12. Thus, only the major differences between the two embodiments of a foil cutter are described hereinbelow. Thus, unless otherwise specified, the comments made relative to foil cutter 12 apply to foil cutter 22.

FIG. 3A depicts a bottle 21 with foil cutter 22 mounted in the correct position on top of bottle 21.

FIG. 3B illustrates a top, isometric view of foil cutter 22. Foil cutter 22 includes a body 23, which has a top side and a bottom side, and which is substantially U-shaped with two opposing arms. Body 23 has an elongated neck 26, on each of the two opposing arms. Each elongated neck 26 protrudes upward from the top side and has a retaining lip 24 in the shape of a circular sector that protrudes towards the interior, i.e. towards the opposing elongated neck 26. When the user presses the two opposing arms of foil cutter 22 against the bottle, lip 24 enables foil cutter 22 to rest on the mouth of bottle 21 and secures or retains bottle 21 from the top and the two lips 24 form a substantial portion of a circle. Foil cutter 22 also includes four cutters 25 that are attached to body 23 such that the axial distance from cutters 25 to the top side of foil cutter 22 is approximately the distance from the top of the bottle to below the bead of the bottle, i.e. dimension C of FIG. 1.

Body 23 may be made of molded plastic, sheet metal or another semi-rigid material of an appropriate thickness that bends inward when a user presses against it from the exterior.

Each retaining lip 24 protrudes towards the interior, of foil cutter 22 several millimeters enabling it to rest securely on the top or mouth of bottle 21.

Figure 3D:
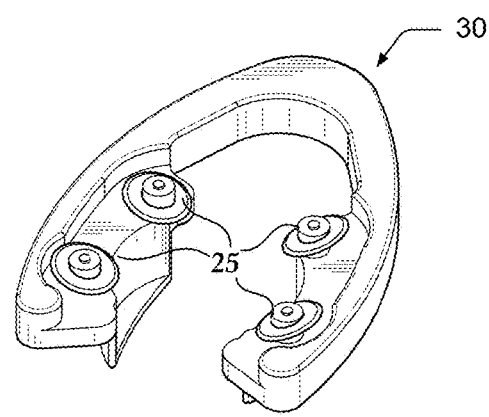

In certain embodiments, as depicted in FIGS. 3B-3D, cutters 25 are cutting wheels that press against bottle 21 and turn or rotate as a user rotates foil cutter 22 around the outside of bottle 21 thus cutting a foil wrapper that covers the top of bottle 11. In other embodiments, cutters 25 may be fixed wheels or cutting surfaces, such as a metal blades. In certain embodiments, as illustrated in FIG. 3D, cutters 25 are angled upwards so as to assist in taking the foil off the bottle.

The operation of foil cutter 22 is identical to that of foil cutter 12 and is described hereinabove with reference to FIGS. 2A-C.

Other Embodiments

It is anticipated that in certain embodiments, foil cutter 12 or foil cutter 22 may be combined with a wine bottle opener or corkscrew. For example, a wine bottle opener might incorporate all of or certain elements of foil cutter 12 or foil cutter 22. Alternatively, foil cutter 12 or foil cutter 22 might include a wine bottle opener element.

The above specification, examples, and data provide a complete description of the manufacture and use of the composition of the invention. Many embodiments of the invention can be made without departing from the spirit and scope of the invention.

What is claimed is:

1. A device for cutting the foil on a bottle, comprising:
   a substantially U-shaped body, comprising:
      first and second opposing arms, when in an upright state, the arms together defining a body top side and a body exterior side, each of the arms defining a bottom side;
      a first neck protruding from the top side on the first arm and a second neck protruding from the top side on the second arm, wherein each of the necks has a circular sector shaped retaining lip that defines a neck interior space, the circular sector shaped retaining lips together forming a substantial portion of a circular shape; and at least one cutting element on each of the bottom sides, wherein when a top of the bottle is received in both of the neck interior spaces so as to engage both of the retaining lips, both of the at least one cutting elements are configured to cut the foil of the bottle.

2. The device of claim 1 wherein each of the at least one cutting elements are cutting wheels.

3. The device of claim 1 wherein each of the at least one cutting elements are blades.

4. The device of claim 1 wherein each of the at least one cutting elements are angled upwards, towards the top side of the arms.

5. The device of claim 1 wherein each of the at least one cutting elements are at least two cutting elements.

6. The device of claim 1 wherein each of the at least one cutting elements are two cutting elements.

7. The device of claim 1 wherein the body is semi-rigid allowing the arms to bend toward one another when a user presses the body exterior side.

* * * * *